United States Patent Office 3,530,353
Patented Sept. 22, 1970

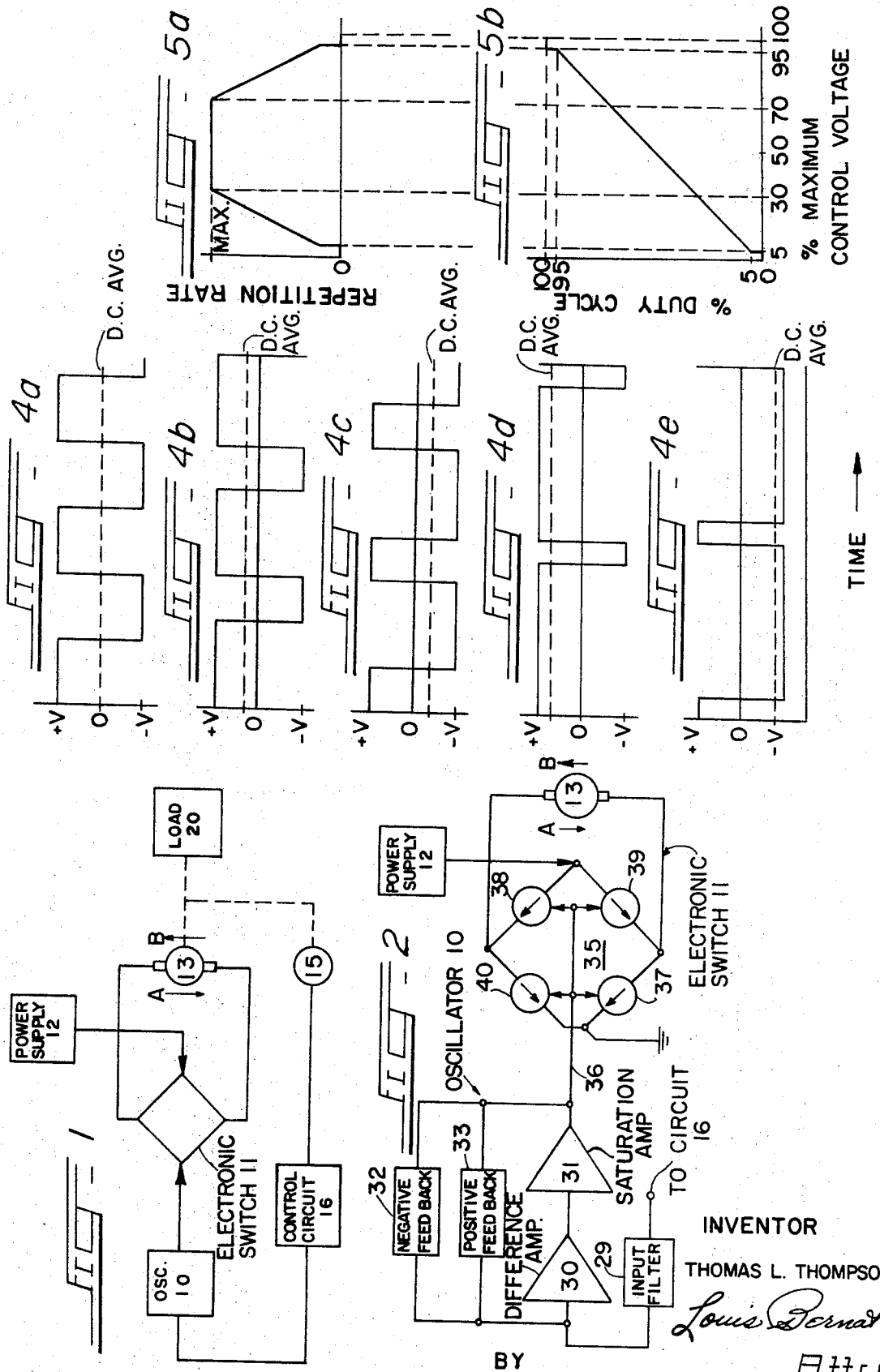

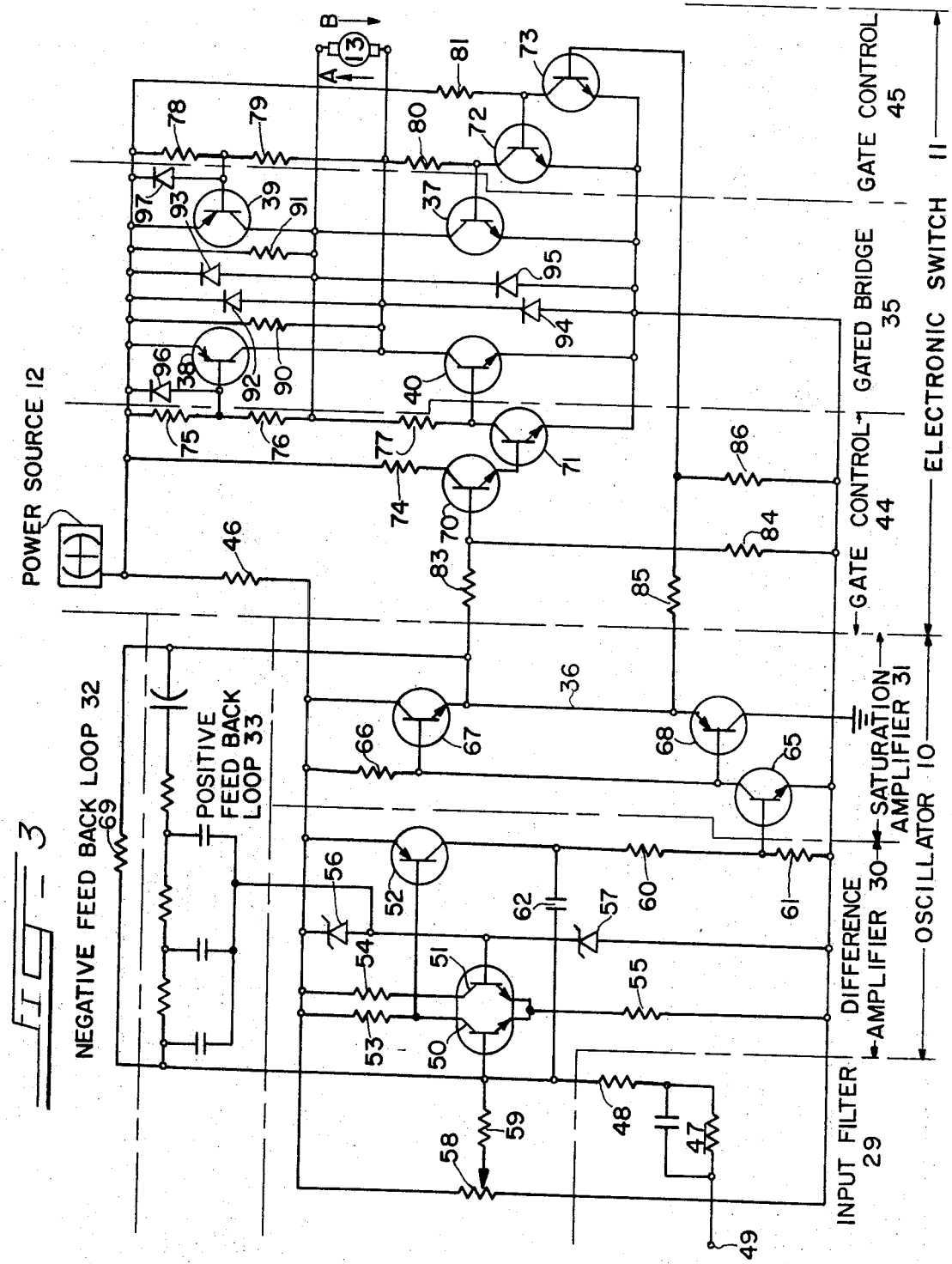

3,530,353
CONTROL CIRCUITS FOR INDUCTIVE LOADS
Thomas L. Thompson, Ingleside, Ill., assignor to Chicago Aerial Industries, Inc., Barrington Village, Ill., a corporation of Delaware
Filed Aug. 30, 1967, Ser. No. 664,562
Int. Cl. H02p 5/16
U.S. Cl. 318—341                 3 Claims

ABSTRACT OF THE DISCLOSURE

A circuit for obtaining bidirectional control of an inductive load by reversing load current with an electrically controlled power switching bridge. An oscillator having a variable duty cycle, regulated by a low power control signal, provides the electronic switching initiation. For motor control applications, constant motor speed may be obtained by using a tachometer feedback loop to provide a control signal proportional to motor shaft speed. Alternatively, a torque motor may be controlled by a voltage analog signal obtained from the feedback of load position information.

---

This invention relates to variable voltage control circuits for inductive loads and more particularly to circuits for providing bidirectional speed control over D.C. motors.

Prior art control systems in this general category commonly utilize a voltage analog derived from the load for controlling the input used for driving the load. In the example of a motor speed control circuit, the voltage analog is derived as a function of motor shaft speed or position. In these systems, the analog voltage is amplified by a power amplifier to supply a driving voltage to the motor. This driving voltage is supplied in varying amounts according to the requirements of the particular application. Thus, if a motor must operate at a constant speed under varying load conditions, the analog voltage regulates the amplifier causing it to supply more drive voltage to the motor under heavy load and less drive voltage when the load is decreased.

The principle disadvantage of such direct power amplification systems is that, when operating with a constant voltage supply, there is a large power loss in the amplifier under light motor load conditions. This power loss manifests itself as heat which is potentially damaging to system components unless safely dissipated. Apparatus for providing this heat dissipation may become very complex and is, at best, bulky in construction. Furthermore, the power consumed by heat losses represents a decidedly uneconomical operation.

In an effort to overcome the disadvantage of direct power amplification systems, prior art systems sometimes utilize transistorized switching circuits to apply voltage to the motor in the form of pulses. The widths of these pulses are controlled so that the time averaged voltage is the correct D.C. equivalent for the required application. Thus, wide pulses supply a high average motor drive voltage for heavy load conditions and narrow pulses supply low voltages under light load conditions. This use of transistor switching has an advantage since it gives a very low power loss. When switched on, the transistors may be operated in a saturated state wherein they draw very low current and dissipate very little power. When the transistors are switched off, of course, they require no power at all. Thus, the power lost in the transistors is very small because the only appreciable loss occurs during switching, and this is accomplished at great speed.

Power switching of the described type may be accomplished by means of a bridge-type transistor switch connected between a power supply and the D.C. motor. Power is then applied to the motor through the bridge with the aforementioned pulsed effect. However, in using such a bridge-type circuit, precautions must be taken to prevent shorting out the power supply by having more than two arms of the bridge conducting simultaneously.

Sometimes known systems attempt to circumvent the problem of simultaneously conductive bridge arms either by inserting resistance in series between the power supply, bridge, and motor or by utilizing a time delay during the switching process so that one path through the bridge circuit is positively shut off before the alternate bridge path is turned on. However, neither of these methods offers the ideal solution to the problem. Insertion of series resistance introduce additional voltage drops in the circuit, consequently reducing the voltage available to control the motor. Furthermore, the voltage drop across the resistors represents a power loss and re-introduces the heat dissipation problem. The alternate solution of using time delayed switching requires additional circuit complexity and the formation of a "dead time zone" during which nothing happens between switching operation. Thus, this alternate solution is both expensive and inefficient.

Therefore, an object of this invention is to provide new and improved semiconductor switching circuits for controlling the voltage in inductive loads. More specifically—although not exclusively—an object is to provide means for controlling a motor either under conditions of varying load or in other applications requiring variable motor speed.

Another object of the invention is to provide an improved speed control circuit for a D.C. motor wherein a pulsed voltage having a relatively high average level is applied to the motor under heavy loading conditions and a pulsed voltage with a relatively low average level is applied to the motor under conditions of light loading.

An important object of this invention is to provide an improved bridge-type semiconductor power switching circuit which operates reliably and economically with no wasted time and no danger to either the components of the circuit or the system within which it is used.

A further object is to provide improved control of a D.C. motor by means of a solid state circuit which is self-adjusting responsive to changes in the load over the entire range of motor operation.

Another important objective of this invention it to provide a small, simple, and efficient transistorized switching circuit for bidirectional speed control of a D.C. motor by means of cyclically reversing the polarity of the drive voltage applied to the motor.

Yet another object of this invention is to provide an improved D.C. motor control system utilizing a low level D.C. voltage analog of motor shaft position or speed to regulate the single polarity output of the motor drive power supply in a manner which provides bidirectional control of the motor shaft automatically in response to changes in load requirements.

In one embodiment of the invention, the above stated, and other, objects are attained by a circuit in which a voltage controlled, variable, square wave oscillator regulates a transistorized, bridge-type power switch that periodically reverses the polarity of voltage applied to the terminals of a D.C. motor from an external power source. The square wave oscillator is controlled by a low level D.C. analog voltage obtained from the output shaft of the motor. The oscillator incorporates a self-contained, automatic frequency variation feature which allows the oscillator to respond to control voltage levels spanning nearly the entire operating range of the motor. The voltage of the external power source is supplied to the motor with periodic phase reversals, the timing of which is regulated by routing motor current through alternate paths of a bridge-type power switch under the control of the oscillator output. Thus, the motor responds to the average current through it, which may be varied to change both speed and direction of rotation of the motor. The power switch handles the relatively high motor current efficiently in a manner that prevents accidental shorting of the power source due to premature switching.

For a better understanding of how the invention accomplishes the above cited and other objects, reference may be made to the accompanying drawings, in which:

FIG. 1 is a block diagram showing the principal functional elements in a D.C. motor speed control system which is constructed according to the teaching of the invention;

FIG. 2 is a block diagram of the oscillator and electronic switch sections of the FIG. 1 system;

FIG. 3 is a schematic circuit diagram showing an exemplary electronic circuit for providing the functions illustrated by the blocks in FIG. 2;

FIGS. 4a through 4e are a series of voltage graphs which illustrate the output waveform derived from the oscillator responsive to various input signal levels; and FIGS. 5a and 5b are a graphical representations of the dynamic control range of the inventive circuit.

Briefly, FIG. 1 shows an oscillator 10, an electronic switch 11, and a power supply 12 for driving a motor 13. A speed detection and feedback control circuit includes a tachometer 15 and a control circuit 16 coupled to regulate the oscillator 10. The tachometer 15 produces an output signal which varies as a function of the shaft speed of motor 13. The control circuit 16 translates this output signal into a low level D.C. oscillator control voltage, and the oscillator output, in turn, controls the switching of motor voltage and hence, motor shaft speed.

The oscillator 10 generates a square wave output signal which may be described as a series of alternately positive going and negative going pulse periods. Depending upon the nature of the input control signal which is received from circuit 16, the positive going pulses may become wider or narrower with respect to the negative going pulses. The square wave output of oscillator 10 is applied to the electronic switch 11 which responds thereto by connecting the power supply 12 to the motor in either of two polarity relationships.

By way of example, current may be thought of as passing through motor 13 in the direction of the arrow A when the square wave pulses from oscillator 10 are a first polarity and in the direction of the arrow B when the square wave pulses are the opposite polarity. However, due to the large inductive load presented by the motor, the current cannot change direction instantaneously as it could with a resistive load. Instead, the current must build up gradually over an extended period in accordance with the timing established by the inductance of the driven load—in this case the motor. Since the fast switching rates of the present invention—typically several thousand times per second—prevent very much current build-up during any single pulse, the circuits of the electronic switch 11 need not withstand the large current reversals that would result from a resistive load.

The current through the switch 11 may be represented by a relatively small A.C. waveform superimposed on a D.C. level. Because the shaft and associated parts of motor 13 have an appreciable inertia, the motor cannot instantaneously follow the small, fast current reversals. Instead, the shaft turns at a speed which reflects the average D.C. value of current, resulting from the voltage pulses that the motor receives. Thus, if the square wave output from oscillator 10 is symmetrical with positive and negative pulses of equal duration, the current build-up in the direction of arrow A is offset by the decay (or reverse build-up) in the direction of arrow B. Therefore, the average current is zero, and the motor shaft stands still.

If the pulses of first polarity become wider than the pulses of the other polarity, current builds up in the direction of arrow A for a longer period of time than it decays in the direction of arrow B. Hence, the average current builds up to some appreciable value other than zero, and the shaft turns in one direction—say clockwise. Conversely, if the pulses of first polarity become narrower than the pulses of the opposite polarity, current builds up in the direction of the arrow B for a longer period of time than it decays in the direction of the arrow A. Hence, the net current is in the direction of the arrow B, and the shaft turns in the opposite direction—counter clockwise under the assumed conditions.

The application of power, responsive to the output of the oscillator 10, drives the motor 13, and it, in turn, drives a variable load represented by a box 20. As the load 20 varies, the shaft speed of motor 13 tends to speed up or slow down. However, when the shaft speed begins to change, the tachometer 15 applies a feedback signal to the control circuit 16 in order to counteract the change in speed. This control circuit 16 responds to the tachometer signal by giving an output signal which causes the oscillator to change the duration of the positive pulses relative to the negative pulses in its square wave output. These pulses operate switch 11 which, in turn, thereby controls motor voltage in accordance with the input control signal to maintain a constant motor speed under the varying load conditions.

The invention is not primarily concerned with either how the tachometer 15 functions or how the control circuit 16 responds to the tachometer output. Instead, it is concerned with how the oscillator 10 is able to change its output in response to the signal from the circuit 16 and how the switch 11 is able to accurately follow the changes in the oscillator output. This general principle may be understood best from a reference to FIG. 2 which includes a block diagram showing the internal arrangement of the oscillator 10 and electronic switch 11.

In greater detail, the oscillator 10 has two stages of amplification 30, 31 with two separate feedback circuits 32, 33 coupled across them. Input filter circuit 29 provides a high-pass coupling between control circuit 16 and amplifier 30. The amplification stage 30 is a differential amplifier having an output proportional to the difference between a fixed bias and the control voltage received from the control circuit 16. In a preferred embodiment, the fixed bias is equal to the median voltage of the range over which the control voltage may vary. At this median voltage, the square wave output is symmetrical so that its positive and negative periods exactly balance each other to give an average zero state. Thus, as the control voltage from circuit 16 causes one polarity of pulses in the square wave to occur for longer or shorter intervals than pulses of the opposite polarity, the net voltage out of oscillator 10 may be described as predominantly positive or negative relative to the zero level.

The amplifier 31 is a saturation amplifier; that is, it operates either turned on in saturation or turned off dependent only upon the sense of the input signal and regardless of its amplitude. Essentially the amplifier functions as an electronic switch having an output that turns positive or negative. Responsive to this change of polarity, the switch 11 changes the direction of current supplied to motor 13.

The feedback circuits 32 and 33 may be viewed as two separately functioning elements even though they share common inputs and outputs. Loop 32 supplies a conventional negative feedback signal for establishing the overall gain of the amplifier 30, 31. Loop 33 is a phase shifting network which operates on the A.C. components of the output signal from amplifier 31. This phase shifted signal acts as a positive feedback for reinforcing any change in voltage appearing at the input. The combined effects of these two loops cause the amplifier circuits 30, 31 to break into oscillation. Since the only possible responses for the output transistors in the saturation amplifier 31 are either to turn on and saturate or to turn off, the oscillator output is a square wave.

The square wave output signal from oscillator 10 is applied over conductor 36 to control a gated bridge 35 in switch 11. Essentially this bridge comprises a system of gates, each of which conducts current in a single direction indicated in the drawing by a small arrow inside a circle representing the gate. When conductor 36 has one polarity, gates 37, 38 are conductive, and current travels through the motor 13 in the direction of the arrow A. When conductor 36 has the opposite polarity, the other two gates 39, 40 are conductive, and motor current is in the opposite direction indicated by arrow B. The transistors in these gates should have a current carrying capacity to suit the load as well as a very fast switching time in order to avoid inefficient power usage. In addition, the switching must be closely controlled to avoid short circuiting the power supply 12.

While other suitable circuits may be provided to implement the block diagram of FIG. 2, the preferred embodiment of the invention is shown in FIG. 3. In this drawing, dot-dashed lines are used to separate the components into functional circuits, as follows: input filter 29, difference amplifier 30, saturation amplifier 31, negative feedback loop 32, positive feedback loop 33, and the electronic switch 11 including the gated bridge 35 and the gate control circuits 44, 45. Power is supplied to amplifiers 30, 31 from the motor driving source 12 through voltage dropping resistor 46.

The input filter 29 includes a high-pass RC filter network 47 and a coupling resistor 48. The network 47 provides a low impedance path for sudden and large input signal changes, such as those which might occur when the motor speeds up or slows down. Thus, as the shaft speed changes, tachometer 15 sends a signal through the control circuit 16, the input terminal 49, and the low impedance of filter 47 to difference amplifier 30.

The difference amplifier 30 includes a pair of amplifying NPN transistors 50, 51 (shown as a dual transistor) and a decoupling PNP transistor 52, all used in common emitter configurations. The transistors 50, 51 are as nearly identical as it is conveniently possible to make them. They have individually associated collector load resistors 53, 54 and a large common emitter biasing resistor 55. The base of transistor 51 is biased at a fixed potential via Zener diodes 56, 57 coupled between the positive bus connected to the power source 12 and the ground bus. Zener diodes are used here to maintain the base bias voltage of transistor 51 as stable as possible. The base of transistor 50 is biased from a voltage dividing potentiometer 58 and a coupling resistor 59. The potentiometer 58 is adjusted with a sample input voltage at the terminal 49 that produces a motor shaft speed output condition of zero. When so adjusted, bias potentials at the bases of the transistors 50, 51 are as nearly equal as possible.

With the described symmetry, approximately equal currents flow through the emitter-collector circuits of the transistors 50, 51. When this symmetry is lost, the transistor having the higher potential on its base—relative to its emitter—conducts a heavier current, and the other transistor conducts a correspondingly lighter current. While the output could be taken from either side of this difference amplifier circuit, it is here shown as taken from the collector of the transistor 50.

The output terminal of the difference amplifier 30 is connected directly to the base of the decoupling transistor 52. The emitter of transistor 52 is coupled directly to the positive power supply bus. The collector is coupled to the ground bus via a voltage dividing pair of resistors 60, 61. The collector is also coupled, via a capacitor 62, to the input terminal of the difference amplifier.

The operation of difference amplifier 30 is conventional. At the selected input voltage, the potentiometer 58 is adjusted so that both of the transistors 50, 51 are conducting approximately equal currents. With transistor 50 turns on, the relatively negative potential on the ground bus reaches the base of transistor 52, and it turns on. If the input voltage swings positive, the base of transistor 50 becomes more positive relative to its emitter, and current conduction increases. As the transistor 50 begins to conduct more current, the decoupling transistor 52 receives a stronger negative bias, and it also conducts more current. If the input voltage swings negative, the base of NPN transistor 50 becomes less positive relative to the emitter, and transistor 50 tends to turn off. When the emitter-collector current drops in transistor 50, the negative potential is reduced at the base of the transistor 52, and its emitter-collector current drops sharply. Hence, it is seen that the emitter-collector current through transistor 52 varies directly with the input voltages to amplifier 30.

Essentially, the saturation amplifier 31 acts as an electronic switch having either a positive or a negative output. Its principal components are an NPN driver transistor 65 used in a common emitter configuration with its base bias supplied from the voltage divider 60, 61 in the collector load of the decoupling transistor 52. The voltage division is such that the base of transistor 65 never becomes more negative than its emitter. Therefore, the transistor 65 cannot switch off completely. The resistor 66 is the collector load of transistor 65.

A second or output stage in amplifier 31 includes an NPN transistor 67 and a PNP transistor 68 coupled in a complementary emitter follower configuration. Depending upon the level of conductivity of the transistor 52, either one or the other of these two transistors is turned on and saturated while the other is turned off. This particular configuration has been selected because it results in very fast switching and because the input controlled switching level is held within very close tolerances.

Three different feedback loops are provided for supplying output-to-input feedback signals which cause the circuit to function as a square wave oscillator with a predetermined gain. A first feedback signal is returned from the output at the emitters of the two transistors 67, 68 through resistor 69 to the base of the input transistor 50. This is negative feedback which stabilizes the overall gain of the oscillator 10. A second feedback signal is obtained via a phase shift circuit 33 which is connected in parallel with the negative feedback resistor 69. This circuit provides phase inversion resulting in positive feedback which reinforces instability and causes oscillation. The time constants of the resistor-capacitor combinations in the phase shift circuit 33 establish the timing of the basic cycle in the oscillation output. This timing may be changed by selecting or adjusting the values of circuit elements in feedback loop 33 in order to better conform the oscillator output to the characteristics of a particular inductive load. A third feedback signal is supplied through the capacitor 62 coupled between the collector of the decoupling transistor 52 and the base of the input transistor 50. This capacitive feedback is also positive and serves to immediately reinforce any change in the input signal. This reinforcement causes an extremely rapid change of the output voltage at 36 when the transistors 67, 68 switch between their operating extremes of saturation and off. Capacitor 62 also determines the minimum width of the output pulses and, thus, is instrumental in establishing the dynamic operating range of the oscillator.

In operation the oscillator 10 is adjusted to be as nearly symmetrical as is conveniently possible. Transistor 50 drives current into the base of the decoupling transistor 52 which turns on to draw current through resistors 60, 61 and turn on the driver 65. The relatively negative ground potential reaches the base of the PNP transistor 68 which turns on and saturates. This turn-on procedure is enhanced by the positive feedback action of capacitor 62. With transistor 68 turned on, the ground potential is applied through positive feedback loop 33 to the input terminal at the base of the transistor 50. After a brief delay determined by the time constants of circuit 33, the base of transistor 50 is made more negative. Transistor 50 begins to conduct less current, and the current being driven into the base of transistor 52 drops. Responsive thereto, its emitter-collector current goes down. As current drops in resistor 61, the voltage drop across it is reduced, and the potential at the base of transistor 65 begins to approach the emitter potential. As the transistor 65 starts to turn off, current drops in resistance 66 so that the base bias on the transistors 67, 68 becomes more positive. The NPN transistor 67 turns on and saturates while the PNP transistor 68 turns off. Again, the transistion is aided by the positive feedback action of capacitor 62. This applies a positive voltage to the phase shift feedback loop 33. After a time delay established by the characteristics of loop 33, the voltage at the base of transistor 50 swings to become more positive. Then, the transistor 50 again begins to conduct more current to complete one cycle in the oscillator output.

As long as the circuit remains in near balance, the positive and negative going half-cycles have a substantially equal duration. Since the transistors 67, 68 saturate when they turn on, the output signal at 36 is a symmetrical square wave.

Next, assume that the input voltage appearing at terminal 49 changes in a negative direction, but remains within the operating range. The oscillator circuit 10 continues to operate as it does in a balanced condition. However, the feedback signal returned from the emitter of transistor 67 now requires more time to overcome the increased negative potential at the base of transistor 50 and reverse its trend of operation. Therefore, the output level on line 36 remains positive for a longer time than when amplifier 30 is operating in a balanced condition. Conversely, when the operation finally does reverse, the resulting negative output on line 36 occupies as shorter time interval than in the balanced circuit state. Thus, the square wave output on line 36 has a positive average value.

If the input terminal 49 becomes positive within the operating range, the reverse operation occurs and the resulting average D.C. voltage of the square wave output on line 36 is predominantly negative.

The electronic switching circuit 11 comprises a gated bridge circuit 35 controlled by circuits 44, 45. Each of the gate control circuits 44, 45 includes a pair of NPN transistors 70, 71 and 72, 73 and their respective load and bias resistors. The transistors 70, 73 are drivers, the transistors 71, 72 are driven. Resistors 74 and 81 are the collector loads for the driver transistors 70, 73 respectively. In the collector load of transistor 71, the resistors 75–77 are a voltage divider used for establishing the bias potentials at the base electrodes of the gate transistors 38, 40. The resistors 78–80 are similar voltage dividers in the collector load of transistor 72, and they are used for establishing the bias potentials at the base electrodes of the gate transistors 37, 39.

Means are provided for cyclically operating the electronic switch 11 to reverse the direction of current in motor 13 responsive to the average D.C. voltage of the square wave output of the oscillator 10. Briefly, the base bias for the transistor 70 is supplied by a voltage divider 83, 84 connected to the oscillator output terminal 36. Likewise, the base bias of the transistor 73 is supplied by a similarly connected voltage divider 85, 86. Since both of these voltage dividers 83, 84 and 85, 86 are connected to the same output terminal of the oscillator 10 and since they are controlled at the same instant when the transistors 67, 68 switch on and off, the transistors 70, 73 switch their conductive states at the same time. However, the two gate control circuits 44, 45 are not completely symmetrical because the transistor 70 is used in an emitter follower configuration, and the transistor 73 is used in a common emitter configuration. A common emitter transistor (such as 73) produces a phase inversion not found in an emitter follower transistor (such as 70). Hence, the on and off bias conditions on the bases of the driven transistors 71, 72 are always opposite at any given instant, and these conditions change simultaneously as a function of the output of oscillator 10. The immediate effect is that either one of the driven transistors 71, 72 is switched on and the other is switched off. The direction of current in motor 13 depends upon which of these transistors is on. Advantageously, this circuit configuration prevents simultaneous conduction by both paths of the bridge which would result in the short-circuiting of power supply 12.

In greater detail, when the polarity at the oscillator output 36 is positive, the bases of the NPN transistors 70, 73 become more positive relative to their emitters, and they turn on. Conversely, if the oscillator output is negative, the bases of the NPN transistors 70, 73 become more negative relative to their emitters, and they turn off. When the base of transistor 70 is positive, its emitter is also made positive from the power source. Accordingly, the base of the transistor 71 is positive, and it turns on. When the base of the transistor 73 is positive so that it turns on, the relatively negative ground potential appears on its collector. This means that the base of the transistor 72 is also negative, and it turns off. When the output terminal 36 of the oscillator 10 swings negative, the reverse occurs so that transistors 70, 71, and 73 turn off, and transistor 72 turns on.

If the transistor 71 is turned on, its collector stands at the relatively negative ground potential. This makes the base of the PNP transistor 38 negative relative to its emitter, and it turns on. Simultaneously, the negative potential at the base of the transistor 40 causes it to turn off. Also, at this time, the transistor 72 is turned off so that the positive potential from source 12 appears at its collector. The bases of the transistors 37, and 39 move positive so that the PNP transistor 39 turns off, and the NPN transistor 37 turns on. Thus, current flows from source 12 through the transistor 38, motor 13 in the direction of arrow A, and transistor 37 to ground.

When the oscillator output reverses polarity, the transistor 71 turns off, and transistor 72 turns on. The positive voltage appearing on the collector of transistor 71 turns on NPN transistor 40 and turns off PNP transistor 38. The negative collector voltage on transistor 72 turns on the PNP transistor 39 and turns off the NPN transistor 37. Current now flows from source 12, through the transistor 39, motor 13 in a direction of the arrow B, and transistor 40 to ground. Thus, it is seen that the direction of current in motor 13 reverses itself depending upon which pair of transistors 37, 38 or 39, 40 is conducting. This, in turn, depends upon the polarity of the output signal from the oscillator 10.

Resistors 90, 91 damp transients caused by the nearly pure inductive load of the motor 13. Advantageously, these resistors also provide collector loads when the motor 13 is disconnected from the switch 11. This loading is especially helpful when the circuit is being tested without a motor as during a check out or trouble shooting.

Diodes 92–95 short circuit the inductive kick from the motor which might otherwise damage the gate transistors.

Means are provided for speeding the transition time required for the bridge transistors to switch on and off. That is, the diodes 96, 97 are coupled to remove charge carriers stored in the base region of the transistors. This speeds the turn off time of the transistors 38, 39. The transistors 71, 72 perform a similar function to speed the turn off time of transistors 40, 37.

An advantageous feature of the preferred circuit in FIG. 3 is illustrated in FIG. 4. When the circuit is in balance, the oscillator 10 provides a symmetrical output, as shown in FIG. 4a. The motor receives equal increments of oppositely going current which average zero, and the motor shaft stands still. The motor begins to turn one way or the other when either the positive or negative going pulse becomes wider (FIGS. 4b through 4e) so that the motor receives either a net positive or a net negative voltage represented by the dashed line labeled D.C. AVG. The aforementioned advantage of the circuit is illustrated in FIGS. 4d and 4e wherein it is shown that the time period of one complete cycle is greater than the corresponding period in FIGS. 4a, 4b and 4c. The net effect of this expanded period is to increase the dynamic operating range of the system, which is defined as the range of input voltages to which the oscillator circuit can respond and control motor speed by proportionately varying the time duration of the positive and negative portions of the output waveform.

Means are provided for shortening the transition or "turn around" time required to switch the gated bridge. In greater detail, the relationship between the duration of the positive and negative pulses and the input voltage level has been previously explained in detail. Also, as previously discussed the basic oscillator cycle is determined by the time constants in phase shift circuit 33, and capacitor 62 is instrumental in establishing the dynamic operating range of the oscillator.

To elaborate, capacitor 62 determines the minimum turn around time of the circuit. That is the shortest time in which the output can switch from one state or polarity, to another, and then back again to the original state. The duration of this turn around time period is equivalent to a particular input voltage level; or, as in the present example involving a bidirectional control system, the minimum turn around time may have both a positive and a negative input voltage level equivalent. Thus, in the latter case, the dynamic range is the span of input voltages between the two levels which determine minimum turn around time.

It is apparent that as the turn around time becomes shorter at a given cycle rate, the dynamic range is increased because the corresponding input voltage levels approach the extremes of the total available range of input voltages thereby expanding the useful range between them, i.e., the dynamic range. The minmium achievable turn around time of a circuit is limited by physical properties of circuit components such as inertia and switching time; hence, the dynamic range can never equal the total available voltage.

In the preferred circuit illustrated herein, the dynamic range at the basic oscillator frequency is limited to the voltage span between approximately 30% and 70% of the maximum available input control voltage. This range corresponds to the minimum turn around time established by capacitor 62. However, it has been determined experimentally that the oscillator frequency begins to decrease when the input control voltage reaches these limits. This decrease is attributed to the response characteristics of phase shift circuit 33. The decrease of oscillator frequency has the effect of shortening minimum turn around time because, although the actual turn around time remains constant, the increase of total cycle time decreases the percentage of the period represented by minimum turn around time.

The decrease in oscillator repetition rate continues in an approximately linear fashion until the dynamic range has increased to include the span of voltage between 5% and 95% of the available input control voltage. Thus, the dynamic range is more than doubled by means of the variation of oscillator frequency automatically produced by the illustrated preferred circuit.

The variation in the repetition rate of the oscillator output is illustrated by the graph of FIG. 5a. Here, the control voltage is plotted along the horizontal axis which is divided into a scale representing percentages of maximum voltage. The oscillator repetition rate is plotted along the vertical axis. The adjustment of potentiometer 58 should be such that the "zero" voltage (FIG. 4a), resulting from a symmetrical operation, is at the 50% point measured along the horizontal axis of FIG. 5a.

From an inspection of the graph, it is seen that the repetition rate holds steady whenever the motor operates within the general range of 30%–70% of its maximum control voltage. In the control voltage ranges of 5%–30% and 70%–95%, the repetition rate drops in a linear manner. Below 5% and above 95%, the input voltage at terminal 49 reaches a level which does not sustain oscillation, and the circuit either saturates or turns off.

FIG. 5b illustrates the oscillator "duty cycle." The term "duty cycle" refers to the ratio of positive voltage excursion time to the total time of one cycle and is expressed as a percentage of the total cycle. The duty cycle is plotted along the vertical axis of FIG. 5b, and the percentage of maximum voltage is plotted along the horizontal axis. From this, it is seen that the oscillator circuit changes its duty cycle in a linear manner over the useful range of 5%–95%. The change in duty cycle is directly proportional to the change in input control voltages over approximately 90% of its range.

In summary, the described circuit accomplishes bi-directional control of a D.C. motor with a high degree of reliability and switches extremely fast with almost no loss of power. Moreover, the power handling transistors either turn on and operate at saturation with minimal power consumption or turn off with no power consumption. Hence, there is little power to dissipate, and negligible heating in the switching transistors thereby enchancing economy, efficiency and component life. In addition, the circuit is self-accommodating to a duty cycle covering about 90% of the range of available motor control voltage.

The foregoing description explains a preferred embodiment of the invention. However, the election to show this particular embodiment is not to be taken as a restriction upon the following claims which are to be construed to cover all equivalents falling within the spirit of the invention. For instance, in the foregoing example a tachometer is employed to generate a command signal to control circuit 16, which translates that signal into a control voltage acceptable to oscillator 10. Thus, the complete circuit functions as a closed loop feedback system. Those familiar with the art will recognize that the command signal may be obtained from a variety of sources including those systems that are not of the closed loop type. Moreover, the controlled inductive load need not be a motor such as illustrated, but may be any inductive load over which control is desired, for example a fluorescent lighting system. Therefore control circuit 16 may assume any one of a variety of forms ranging from very complex circuitry to simple potentiometery type voltage dividers as long as a control voltage having the desired proportionality to the command signal and a scale factor suitable for use with oscillator 10 is obtained.

I claim:

1. A bidirectional D.C. motor speed control circuit comprising:
   a D.C. power source;
   a gated semiconductor bridge-type power switch for coupling said source to run said motor;
   voltage controlled means for periodically causing said switch to reverse the direction in which current flows from said source through said motor;
   wherein said voltage controlled means comprises a multi-staged transistorized variable frequency square wave oscillator including:
   a differential amplifier first stage having input;
   a saturation amplifier final stage having a pair of transistors coupled in complementary emitter follower configuration at its output;
   a negative feedback circuit coupling the output of said final stage to the input of said first stage;
   means for sensing the speed of said motor and producing a voltage analog of said speed to regulate said voltage controlled means; and
   a phase shift network connected in parallel with said negative feedback circuit and coacting therewith to cause oscillation said oscillation having a period determined by the time constants of said phase shift network and a duty cycle proportional to the amplitude and sense of said voltage analog of motor speed.

2. In a circuit for the bidirectional control of a D.C. motor:
- means operated responsive to a varying low power signal input for controlling a high power driving source of a direct current said means comprising electrical signal amplifying means for converting said low power signal into periodically recurring pulses having a duty cycle proportional to the amplitude of said low power signal input;

wherein said electrical signal amplifying means comprises:
- a differential amplifier input stage said differential amplifier having a first input for receiving said low power signal a second input biased at a level representing the median of the operating range of said first input and an output representing the difference between said first and second inputs;
- means comprising a saturation amplifier output stage having an input connected to said differential amplifier output said saturation amplifier having an output that varies between the positive and negative limits of circuit voltage responsive to the sense of said differential amplifier output;
- negative feedback means connecting said saturation amplifier output to said first input of said differential amplifier;
- an electrical phase shifting network connected in parallel with said negative feedback means said phase shifting network providing reinforcement of said low power signal and co-acting with said negative feedback means and said low power signal to cause a controlled oscillation of said saturation amplifier output; and
- electrical switching means operated by said pulses for controlling the average power applied to a D.C. motor from said high power driving source.

3. A semiconductor control circuit for use with a D.C. motor a source of low power input control signals and a source of high power motor drive voltage said control circuit comprising:
- electrical oscillator means having a periodically alternating output with a waveform representing the amplitude of said control signals;

wherein said electrical oscillator means comprises:
- a differential amplifier stage having an input for receiving said control signals and an output representing the difference between said input control signals and a fixed reference voltage;
- means comprising a saturation amplifier output stage for providing said alternating output having one of two fixed levels and a sense dependent upon said differential amplifier output;
- means comprising coacting positive and negative feedback networks connecting the output of said output stage to the input of said input stage for controlling the period of oscillation; and
- bridge-type power switch means connected between said motor and said motor drive source said switch means operating in response to said alternating output of said oscillator for reversing the polarity of voltage applied from said high power source to said motor.

References Cited
UNITED STATES PATENTS

| | | | |
|---|---|---|---|
| 3,144,564 | 8/1964 | Sikorra | 330—104 X |
| 3,233,161 | 2/1966 | Sikorra | 318—341 X |
| 3,260,912 | 7/1966 | Gregory | 318—341 |
| 3,284,689 | 11/1966 | Rosa | 318—345 X |

ORIS L. RADER, Primary Examiner

R. J. HICKEY, Assistant Examiner